(12) United States Patent
Chen

(10) Patent No.: US 9,222,647 B2
(45) Date of Patent: Dec. 29, 2015

(54) HYBRID BACKLIGHT UNIT EMBEDDABLE IN LIQUID CRYSTAL DISPLAY AND METHOD FOR FABRICATING THE SAME

(71) Applicant: Shui-Lung Chen, Taoyuan (TW)

(72) Inventor: Shui-Lung Chen, Taoyuan (TW)

(*) Notice: Subject to any disclaimer, the term of this patent is extended or adjusted under 35 U.S.C. 154(b) by 373 days.

(21) Appl. No.: 13/762,343

(22) Filed: Feb. 7, 2013

(65) Prior Publication Data

US 2014/0153212 A1  Jun. 5, 2014

Related U.S. Application Data

(63) Continuation-in-part of application No. 13/706,347, filed on Dec. 5, 2012.

(51) Int. Cl.
| | |
|---|---|
| *F21V 7/04* | (2006.01) |
| *F21V 9/14* | (2006.01) |
| *F21V 8/00* | (2006.01) |

(52) U.S. Cl.
CPC ............... *F21V 9/14* (2013.01); *G02B 6/0043* (2013.01); *G02B 6/0051* (2013.01); *G02B 6/0055* (2013.01); *G02B 6/0056* (2013.01); *G02B 6/0083* (2013.01); *G02B 6/0031* (2013.01); *G02B 6/0093* (2013.01)

(58) Field of Classification Search
CPC .... G02B 6/0031; G02B 6/005; G02B 6/0055; G02B 6/0035; G02B 6/0051; G02B 6/0088; G02B 6/0053; G02B 6/0018; G02B 6/0023; G02B 6/0043; G02B 6/34; G02B 5/02; G02B 5/045; G02B 6/0025; G02B 6/0026
USPC .................................................. 362/600–634
See application file for complete search history.

(56) References Cited

U.S. PATENT DOCUMENTS

2007/0116424 A1* 5/2007 Ting et al. ..................... 385/147

* cited by examiner

*Primary Examiner* — William Carter
(74) *Attorney, Agent, or Firm* — Raymond Y. Chan; David and Raymond Patent Firm

(57) ABSTRACT

A hybrid backlight unit embeddable in liquid crystal display and method for fabricating the same is disclosed. The hybrid backlight unit uses chemically toughened glass as substrate, which, after optical layers are stacked thereon using photo-chemical lithography and coating-printing process, laminates with a polarizing film to form an optical substrate with hybrid planar light source capable of producing polarization effect. The optical substrate with hybrid planar light source may be incorporated in the fabrication of liquid crystal panel as its lower glass substrate and lower polarizing film. Finally an external structure is attached to the liquid crystal panel to form a hybrid backlight unit embeddable in liquid crystal display. The hybrid backlight unit embeddable in liquid crystal display described above offers the advantages of high luminance, ultra thinness and high efficiency in fabrication. This hybrid backlight unit product can be designed as bottom lit or edge lit and used mainly in liquid crystal displays.

1 Claim, 5 Drawing Sheets

HYBRID BACKLIGHT UNIT EMBEDDABLE IN LIQUID CRYSTAL DISPLAY AND METHOD FOR FABRICATING THE SAME

CROSS REFERENCE OF RELATED APPLICATION

This is a Continuation-In-Part application that claims the benefit of priority under 35 U.S.C. §119 to a non-provisional application, application Ser. No. 13/706,347, filed Dec. 5, 2012.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a hybrid backlight unit embeddable in liquid crystal display and method for fabricating the same, more particularly a method for fabricating a hybrid backup unit using photochemical lithography to fabricate an optical microstructure and using coating technique to stack optical layers on a chemically toughened glass, which is then structurally laminated with a polarizing film to form a hybrid backlight unit capable of producing polarization effect.

2. Description of Related Arts

Along with technological advancement, nowadays liquid crystal display (LCD) is used extensively in electronic products, such as mobile phones, notebook computers, tablet computers, digital cameras and LCD televisions. Because LCD is not a self-luminous device that it only comes with the function of light switch control, it requires the aid of planar light source from a backlight unit to achieve the display function.

FIG. 1 is an exploded view of a conventional backlight unit 10. Currently there are two types of backlight unit—bottom-lit backlight unit 10 and edge-lit backlight unit 10. Regardless of the type, backlight units 10 have similar components and structure, which mainly consist of an upper diffusion sheet 12, an upper prism lens 13, a lower prism lens 14, a lower diffusion sheet 15, a light guide plate 18, a reflective sheet 19, a plastic frame 17, an iron frame 20 and a light bar 16 stacked over each other and fixed with cushion 11. The whole manufacturing process requires considerable manpower.

As electronic products are designed to be lighter, thinner, shorter and smaller, the bigger the sizes of light-guide plate 18, plastic frame 17 and iron frame 20 in conventional backlight units, the more difficult it is to make the product thinner. Moreover as upper diffusion sheet 12, upper prism lens 13, lower prism lens 14 and lower diffusion sheet 15 are respectively disposed on the substrate of backlight unit, the substrate has certain thickness requirement. Therefore as the design of electronic products is geared towards lightweight, thin, short and small, using ultrathin backlight unit with high efficiency in fabrication and high luminance is an important issue that the non-self-luminous display manufacturers must address at the present time.

In light of the problem discussed above, the present invention aims primarily to provide a hybrid backlight unit embeddable in liquid crystal display and its fabrication method to address the problems of being unable to achieve ultrathin unit, difficulty in increasing luminance, high costs of fabricating optical components, and lack of fabrication efficiency encountered by prior art. The hybrid backlight unit embeddable in liquid crystal display and method for fabricating the same of the invention simplifies the whole manufacturing process and results in lighter and thinner structure, while shortening the processing time and improving product yield. These are the foremost spirits of the invention to be disclosed.

SUMMARY OF THE PRESENT INVENTION

The object of the present invention is to provide a hybrid backlight unit embeddable in liquid crystal display and method for fabricating the same. The whole construction of the hybrid backlight unit constitutes two parts—an embedded structure and an external structure. The embedded structure uses chemically toughened glass as substrate, which, with optical layers fabricated thereon using photochemical lithography and coating-printing process, combines with polarizing film to form an optical substrate with planar light source. The optical substrate with planar light source is incorporated in the fabrication of a liquid crystal panel as its lower glass substrate and lower polarizing film. The embedded structure comprises a protective layer, a lower polarizing film, a connecting layer, a diffusion layer, an upper transparent layer, an upper reflective layer, a light shielding layer, a light guide layer, an optical microstructure layer, a lower transparent layer and a lower reflective layer. The external structure is attached to the completed liquid crystal panel and comprises a light reflector, cushion and light source module.

To achieve the aforesaid object, the present invention provides a hybrid backlight unit embeddable in liquid crystal display and method for fabricating the same, comprising a protective layer, a lower polarizing film, a connecting layer, a diffusion layer, an upper transparent layer, an upper reflective layer, a light shielding layer, a light guide layer, an optical microstructure layer, a lower transparent layer, a lower reflective layer, a light source module, a light reflector and a cushion.

The protective layer is for protecting the lower polarizing film, hence the optical substrate with planar light source from scratch during the fabrication of liquid crystal panel. This is achieved by coating a layer of transparent resin consisting of acrylic resin or epoxy resin or mixture thereof on the lower polarizing film and light shielding layer using coating-printing process. The lower polarizing film substitutes the function of lower polarizing plate in the liquid crystal panel. Structurally the polarizing film consists of a polarizing substrate and a support protective layer. The polarizing substrate is made of dyed or iodine-containing polyvinyl alcohol (PVA), while the support protective layer is made of polyimide film coated with SiO2. The connecting layer is for connecting the polarizing film and the diffusion layer. It is achieved by coating a layer of transparent resin consisting of acrylic resin or epoxy resin or mixture thereof on the diffusion layer using coating-printing process. The diffusion layer scatters the light from emitting surface uniformly into a planar light source and adjusts the color temperature of the planar light source. The diffusion layer is coated on the upper transparent layer using coating-printing process, and made of SiO2 micro- and nano-particles, dye, and acrylic resin or epoxy resin or mixture thereof in different proportions. The light transmittance of diffusion layer ranges from 30% to 98%. The upper reflective layer prevents the light ray in the range of light shielding layer that has passed through the upper transparent layer from being absorbed by the light shielding layer and resulting in energy loss. The upper reflective layer is coated on the upper transparent layer using coating-printing process and is made of TiO2 or silver or aluminum micro- and nanoparticles and acrylic resin or epoxy resin or mixture thereof. The light shielding layer shields the light in non-display area of the liquid crystal panel. The light shielding layer is coated on the upper reflective layer using coating-printing process and is made of acrylic resin or epoxy resin or mixture thereof added with dye in different proportions. The light guide layer made from a transparent substrate is made of chemically toughened glass in the shape of a thin plate. The thickness of the chemically toughened glass ranges from 0.1 mm to 5 mm. The optical microstructure layer is made of high refractive index material and forms a predetermined optical microstructure pattern on the transparent substrate of the light guide layer using photochemical lithography or print coating. Each microstructure in the optical microstructure layer ranges from 0.028 micron to 200 micron if photochemical lithography is used and ranges from 10 micron to 200 micron if coating-printing process is used. The optical microstructure layer refracts the incident light with its predetermined optical microstructure pattern, which is adjustable to adjust the distribution of incident light from the planar light source module. The material of optical microstructure layer consists of TiO2 or silver or aluminum micro- and nanoparticles and acrylic resin or epoxy resin or mixture thereof The upper and lower transparent layer is made of transparent resin material coated on the reflective surface of transparent substrate of light guide layer and optical microstructure layer to allow the passage of light ray not refracted by the optical microstructure layer to the reflective layer and the diffusion layer. The upper and lower transparent layer is made of transparent resin material, which is acrylic resin or epoxy resin or mixture thereof. The lower reflective layer reflects the light ray having passed through the transparent layer to the light guide layer, which is then refracted by the optical microstructure layer to the diffusion layer. The lower reflective layer mainly reflects the light that has passed through the transparent layer to the light guide layer, where the light is refracted by the optical microstructure layer to reach the diffusion laser. The lower reflective layer is coated on the lower transparent layer using coating-printing process and is made of TiO2 or silver or aluminum micro- and nanoparticles and acrylic resin or epoxy resin or mixture thereof. The light source module provides an incident light source to the light guide layer. The light reflector reflects the incident light from the light source module to the light guide layer. The cushion enhances the resistance of liquid crystal display to vibration and impact.

To achieve the aforesaid object, the present invention provides a method for fabricating hybrid backlight unit embeddable in liquid crystal display. The hybrid backlight unit constitutes an embedded structure and an external structure. The embedded structure should be completed first to form an optical substrate with planar light source. The embedded structure uses chemically toughened glass as substrate, which combines optical layers fabricated with photochemical lithography and coating-printing process with a polarizing film to form an optical substrate with hybrid planar light source. The optical substrate with hybrid planar light source may be incorporated in the fabrication of liquid crystal panel as its lower glass substrate and lower polarizing film. Finally the external structure comprising a light source module, a light reflector and a cushion is attached to the liquid crystal panel embedded with the optical substrate with planar light source to form a hybrid backlight unit embeddable in liquid crystal display.

DETAILED DESCRIPTION OF THE PREFERRED EMBODIMENT

The implementation of the invention is described below through specific embodiments of the invention. Persons skilled in the art can easily understand other advantages and effects of the invention through the description disclosed herein.

The embodiments of the invention are described below in reference to the accompanying drawings. It should be noted that the drawings are simplified schematic drawings to illustrate the basic ideas of the invention schematically. The diagrams only depict the related structure of the invention and are not drawn according to the actual number, shapes and dimensions of components used in actual implementation, and hence should not be construed as a limitation on the forms, quantities and dimensions of respective components in actual implementation, which may vary based on the actual design needs.

Figure 1:
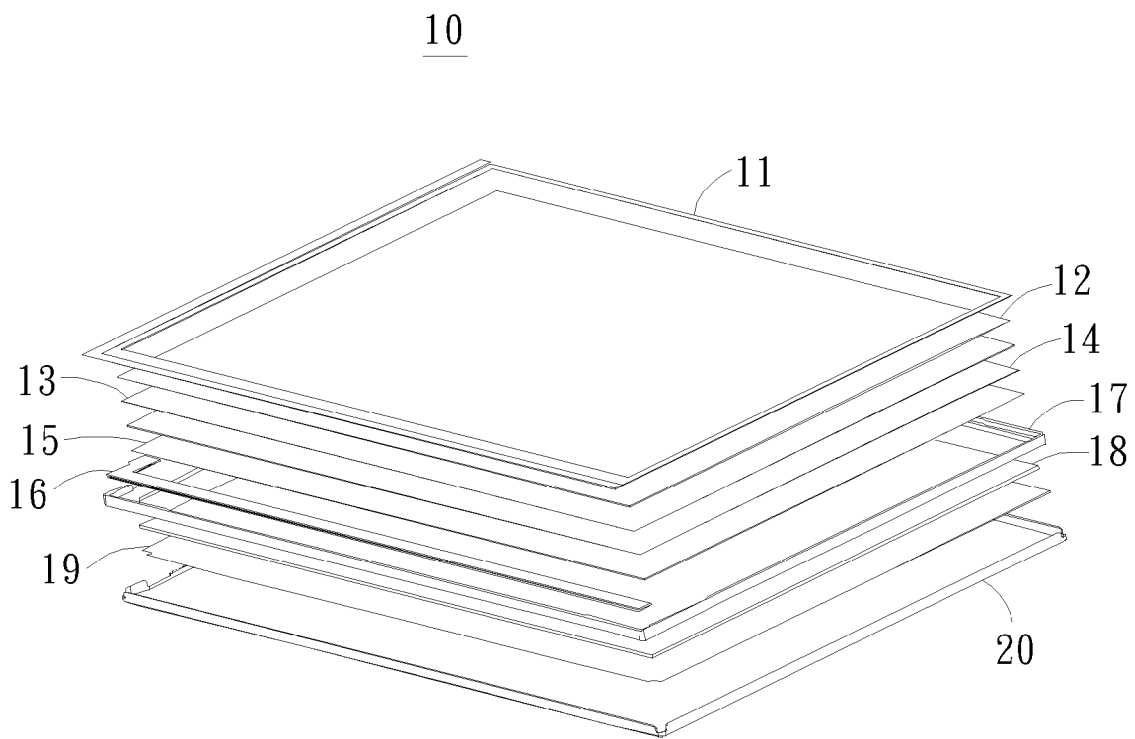
FIG. 1 is an exploded view of a conventional backlight unit.
Figure 2:
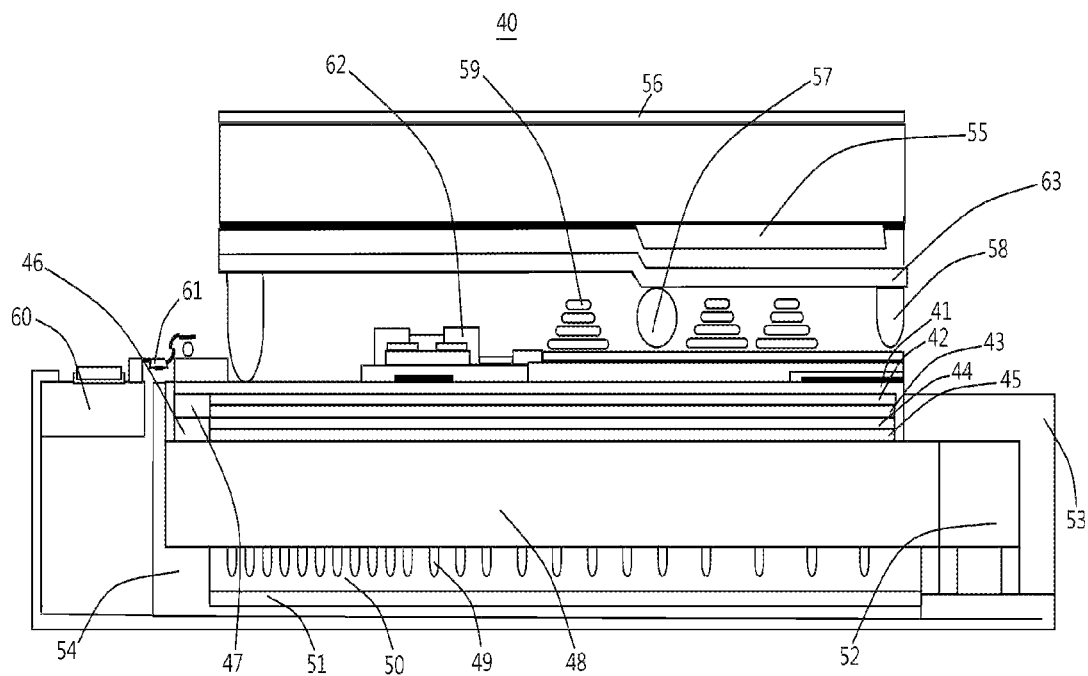
FIG. 2 is a sectional view of the hybrid backlight unit embeddable in liquid crystal display according to a preferred embodiment of the invention.
Figure 3:
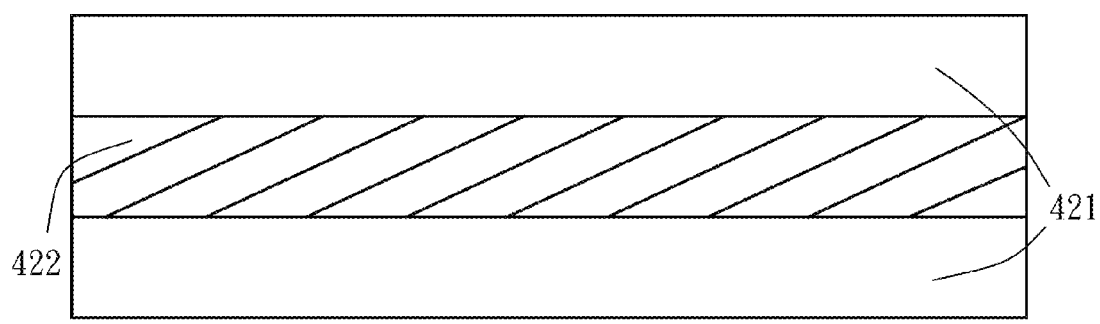
FIG. 3 is a sectional view of the lower polarizing film in FIG. 2.
Figure 4:
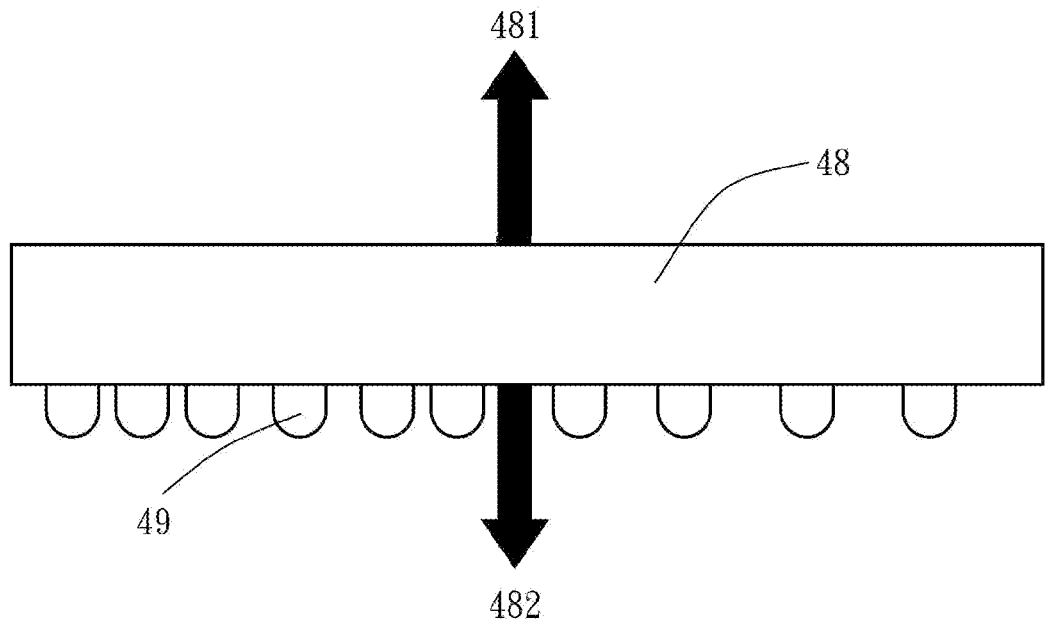
FIG. 4 is section view of the light emitting surface and reflective surface in step 81.
Figure 5:
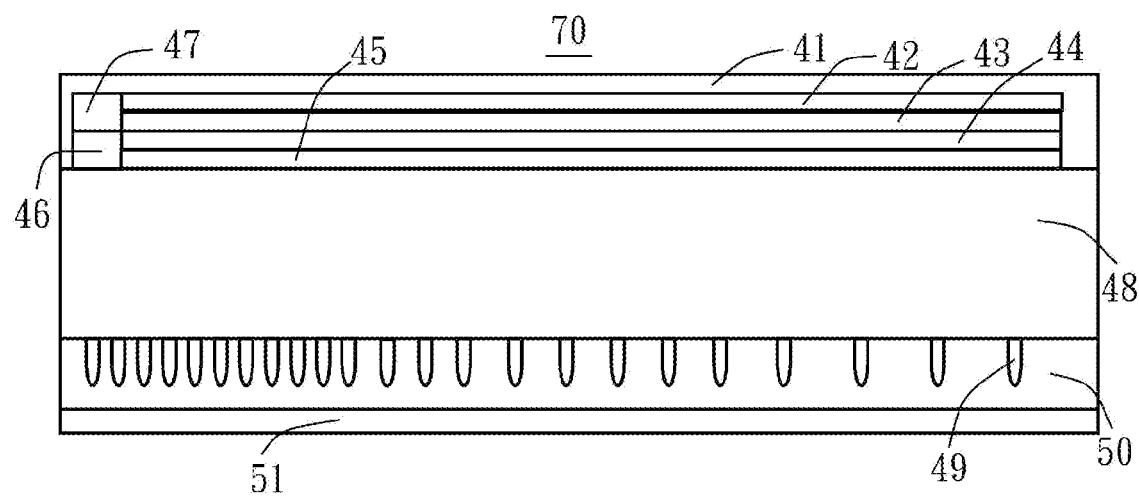
FIG. 5 is a sectional view of the optical substrate with planar light source in the hybrid backlight unit embeddable in liquid crystal display according to the invention.
Figure 6A:
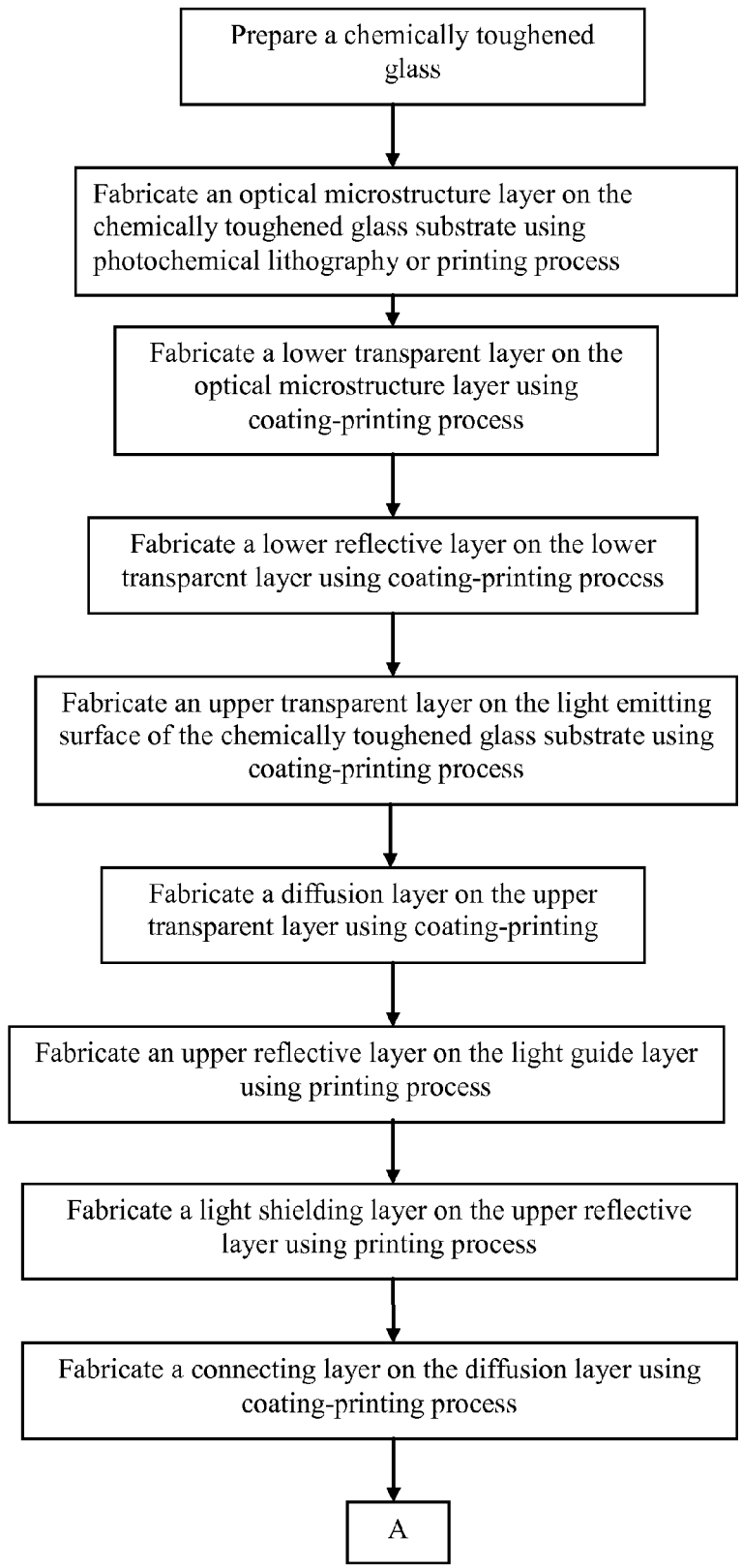
FIGS. 6A and 6B illustrate the process flowchart of the invention.
Figure 6B:
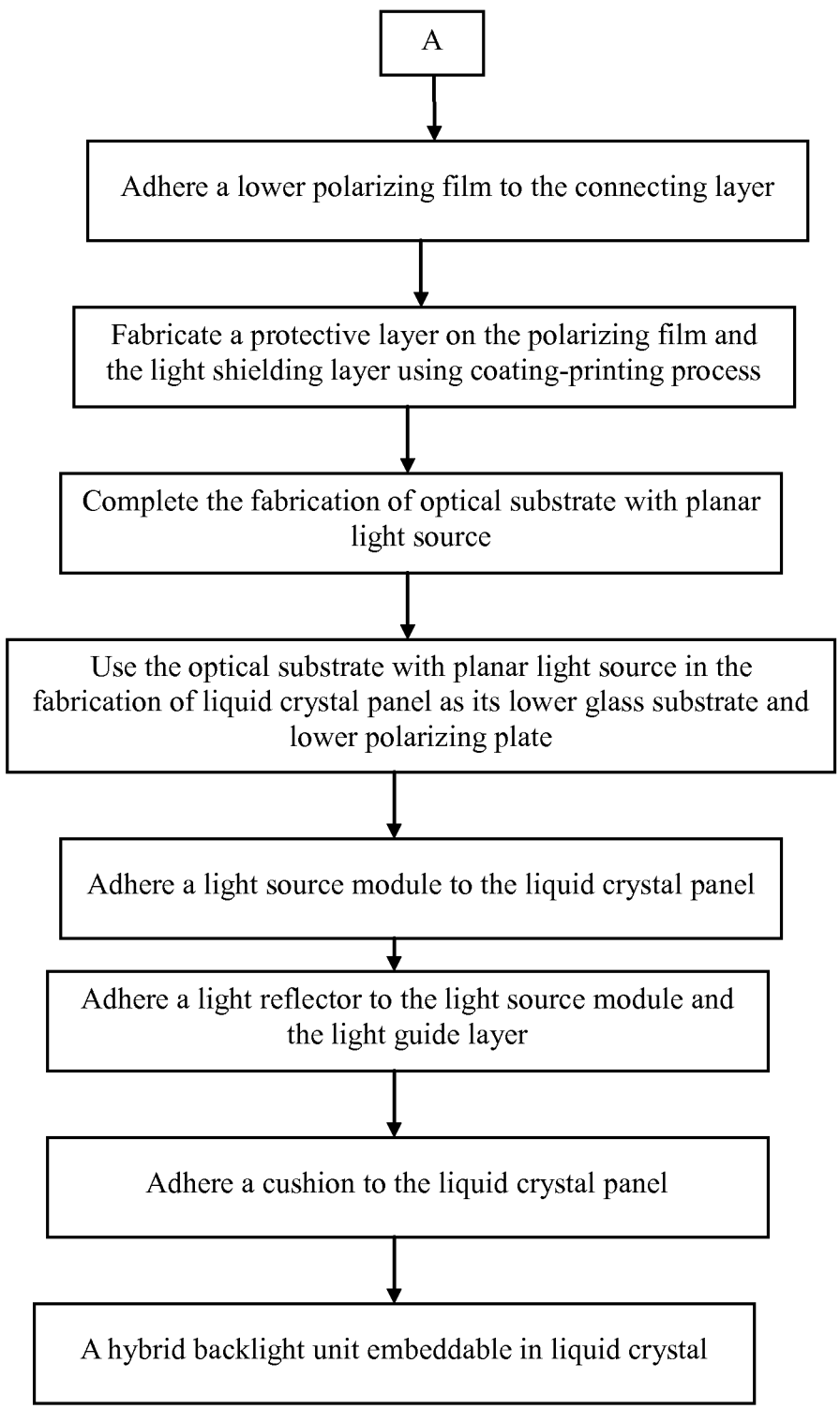

Referring to FIGS. 2~6, the hybrid backlight unit embeddable in liquid crystal display 40 comprises a protective layer 41, a lower polarizing film 42, a connecting layer 43, a diffusion layer 44, an upper transparent layer 45, an upper reflective layer 46, a light shielding layer 47, a light guide layer 48, an optical microstructure layer 49, a lower transparent layer 50, a lower reflective layer 51, a light source module 52, a light reflector 53 and a cushion 54 laminated and stacked over each other.

The chemically toughened glass substrate is used as the light guide layer 48 in the hybrid backlight unit embeddable in liquid crystal display 40. First an optical microstructure layer 49 is fabricated on the reflective surface 482 of the light guide layer 48 using photochemical lithography or printing process. A lower transparent layer 50 is then formed on the optical microstructure layer 49 using coating-printing process and a lower reflective layer 51 is formed on the lower transparent layer 50 using coating-printing process. Next an upper transparent layer 45 is formed on the light emitting surface 481 of the light guide layer 48 using coating-printing process, and a diffusion layer 44 is formed on the upper transparent layer 45 using coating-printing process. Subsequently an upper reflective layer 46 is formed on the light emitting surface 481 of the light guide layer 48 using printing process, a light shielding layer 47 is fabricated on the upper reflective layer 46, and a connecting layer 43 is formed on the diffusion layer 44 using coating-printing process. Next, a lower polarizing film 42 is laminated over the connecting layer 43, and a protective layer 41 is formed on the lower polarizing film 42 and the light shielding layer 47 to complete an optical substrate with planar light source 70. The optical substrate with planar light source 70 is incorporated in the fabrication of liquid crystal panel to replace its lower glass substrate and lower polarizing film. Finally, a light source module 52, a light reflector 53 and a cushion 54 are attached to the liquid crystal panel to complete the fabrication of a hybrid backlight unit embeddable in liquid crystal display 40.

The preferred embodiments of the present invention have been disclosed. It should be understood that all additions, modifications and substitutions made to the preferred embodiments of the invention without departing from the spirits of the invention and appended claims shall remain within the protected scope and claims of the invention. Persons skilled in the art can realize that the invention can be applied in modified form, structure, arrangement, proportion, material, element and component. Therefore, the examples cited above are meant to explain the invention and not to limit the invention. The actual applicable scope of the invention is defined by the claims below and covers all legal equivalents thereof without being limited by the descriptions above.

What is claimed is:

1. A method for fabricating hybrid backlight unit embeddable in liquid crystal display, comprising the steps of:

preparing a chemical toughened glass substrate;
fabricating an optical microstructure layer on the chemically toughened glass substrate using photochemical lithography or printing process;
fabricating a lower transparent layer on the optical microstructure layer using coating-printing process;
fabricating a lower reflecting layer on the lower transparent layer using coating-printing process;
fabricating an upper transparent layer on the light emitting surface of the chemically toughened glass substrate using coating-printing process;
fabricating a diffusion layer on the upper transparent layer using coating-printing process;
fabricating an upper reflective layer on the light guide layer using printing process;
fabricating a light shielding layer on the upper reflective layer using printing process;
fabricating a connecting layer on the diffusion layer using coating-printing process;
adhering a lower polarizing film to the connecting layer;
fabricating a protective layer on the polarizing film and the light shielding layer using coating-printing process;
using the optical substrate with planar light source in the fabrication of liquid crystal panel as its lower glass substrate and lower polarizing plate;
adhering a light source module to the liquid crystal panel;
adhering a light reflector to the light source module and the light guide layer;
adhering a cushion to the liquid crystal panel; and
forming a hybrid backlight unit embeddable in liquid crystal display.

* * * * *